United States Patent Office 3,720,416
Patented Mar. 13, 1973

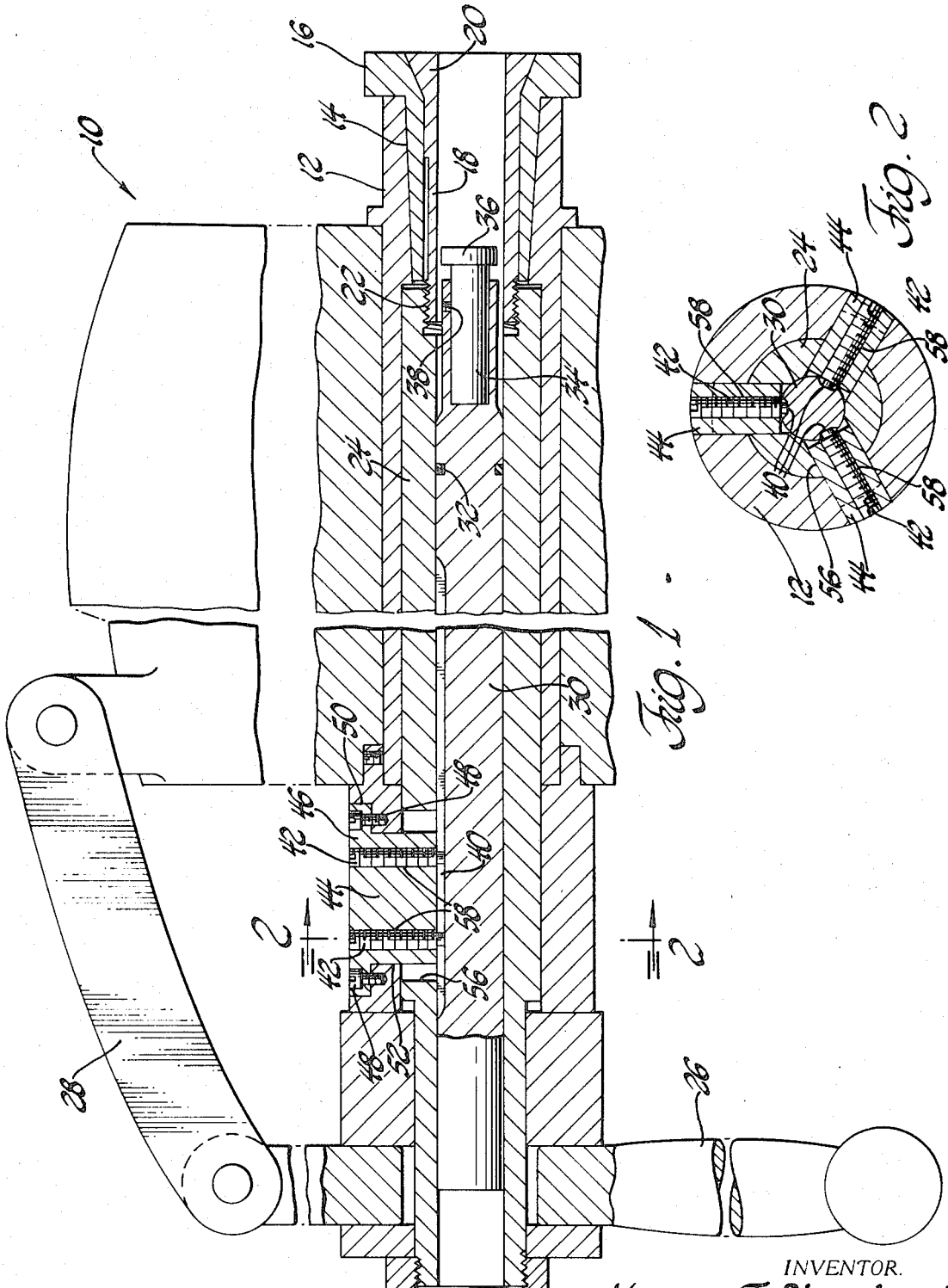

3,720,416
ADJUSTABLE WORK STOP FOR TURNING MACHINE
Vernon F. Blanchard, 25916 W. Seven Mile Road, Detroit, Mich. 48084
Filed Oct. 8, 1971, Ser. No. 187,709
Int. Cl. B23b 31/20
U.S. Cl. 279—1 S                6 Claims

ABSTRACT OF THE DISCLOSURE

A work stop for the collet of a turning machine takes the form of an elongated rod rotatably supported internally of the draw bar. The rod is fixed to the spindle by three removable keys, retained on an annular housing fixed to the spindle which project inward radially through elongated slots in the draw bar to engage longitudinal keyways formed in a surface of the stop rod. Set screws threaded in the keys bear against the surfaces of the rod so as to fix it with respect to the spindle. The extension of the stop relative to the collet may be adjusted by loosening the set screws and the keys may be removed from the spindle to allow the throughfeed of bar stock.

BACKGROUND OF THE INVENTION

(1) Field of the invention

This invention relates to positive stops which allow the proper axial positioning of workpieces within collets independently of variations in diameters of the workpieces.

(2) Description of the prior art

Tapered collets are commonly employed with lathes, grinders, mills and like machines having rotary spindles to support workpieces having cylindrical outer surfaces. The collet jaws allow the workpiece to be inserted into the collet to a depth that is dependent on the outer diameter of the workpiece. When the outer diameters of a group of workpieces are all formed to the same dimension within a high degree of precision they may be successively inserted into the collet to the same depth so as to allow them to be operated upon by the machine to form identical finished parts. However, when the outer diameters of a group of parts to be operated upon by a common machine have the same nominal diameter, but are not identical, it is necessary to individually measure their extension from the collet in order to insure that they are operated upon in an identical manner.

To obviate this difficulty it has previously been proposed that positive stops be provided for such machines to allow the insertion of a workpiece into the collet until it abuts the stop so that parts having different outer diameters will project to the same length. One class of such stops has been proposed which are supported from the rear of the spindle and project through the draw bar into the collet area. A number of difficulties are encountered in the use of such collets. For one thing, if the stop is stationary with respect to the machine base the ends of the parts which abut the stop will be abraided by the stop as the spindle rotates. This prevents the use of such stops with workpieces which must be previously finished to a high degree of accuracy. Another problem arises from the extension of the supporting mechanism for the stop to the rear of the machine and the need for adjusting the position of this stop from this rear area. Both of these requirements increase the area needed for machine clearance which is sometimes not attainable.

Another problem associated with the use of these stops is that they prevent the machine from being used to operate on elongated bar stock which must be progressively fed through the collet.

SUMMARY OF THE INVENTION

The present invention contemplates a positive stop for use with tapered collets which overcomes these problems of the prior art and moreover is simple in construction so as to be relatively low in cost and reliable in operation.

The invention broadly takes the form of an elongated stop bar disposed internally of the draw bar so that its forward end projects into the collet area. The stop is supported for rotation with the spindle and against axial movement by the plurality of radial keys having their outer ends fixed with respect to the spindle which project through longitudinally aligned slots formed at circumferentially spaced intervals in the draw bar so that the inner ends of the keys are fixed to the stop bar.

In a preferred embodiment of the invention, which will subsequently be disclosed in detail, the keys are fixed to an annular housing that is retained on the spindle and projects over an area of the draw bar. The internal ends of the keys are disposed adjacent longitudinally aligned keyways formed at circumferentially spaced intervals on the stop bar. Set screws are threaded in the keys and may be tightened against the stop bar to fix it in a particular axial position.

The forward end of the stop bar is socketed to receive any one of a plurality of replaceable stops formed with surfaces that are adapted to abut against particular workpiece shapes.

In order to adjust the stop position axially the set screws are loosened and the bar is moved forward against a properly positioned workpiece until the stop hits the rear of the workpiece. The set screws are then tightened and the stop is positioned so as to properly orient subsequent workpieces. In order to adapt the machine for use with elongated bar stock the keys are removed from the housing and the stop bar is withdrawn through the rear of the draw bar.

The resulting stop structure is extremely simple, reliable and easy to use.

Other objectives, advantages and applications of the invention will be made apparent by the following detailed description of a preferred embodiment to the invention. The description makes reference to the accompanying drawings, in which:

FIG. 1 is a sectional view through the spindle of a turning machine equipped with a collet and a collet stop formed in accordance with the preferred embodiment of the invention; and FIG. 2 is a sectional view through the stop bar of FIG. 1 taken along line 2—2 of FIG. 1.

While the preferred embodiment of the invention is disclosed as being used in connection with a lathe, it is equally applicable to grinders, mills, or other machines having a rotary spindle in which a workpiece or tool must be positioned.

Referring to the drawings, the invention is used with a machine having a stationary main frame, generally indicated at 10, and a hollow rotary spindle, generally indicated at 12, rotatably supported within the main frame and powered for rotation by any form of conventional mechanism.

At the right end as viewed in FIG. 2, or what will be termed the "forward end," the interior diameter of the spindle 12 is tapered as at 14 to receive a generally cylindrical collet adaptor 16. The collet adaptor has a tapered interior surface and supports a conventional tapered collet 18 having a plurality of segmented fingers 20 adapted to engage a workpiece disposed within the collet. The collet is slidably disposed within the collet adaptor 16 and as it is moved toward the rear of the spindle, or the left as viewed in FIG. 2, the fingers 20 tend to close about a suitable workpiece disposed within the collet.

The rear end of the draw bar 24 is connected to a as to engage the threaded interior diameter of the forward end of a tubular draw bar 24 forming a part of the machine. The draw bar is supported for axial motion within the spindle 12.

The read end of the draw bar 24 is connected to a manually engageable lever mechanism 26 which allows the draw tube and its connected collet to be moved axially with respect to the spindle. Very broadly, the lever 26 is adapted to pivot about the one end of a link 28 which has its other end pivotally attached to the main housing 10. This axial motion moves the collet 18 between a first position wherein its fingers are expanded so as to accept a workpiece and a second position wherein its fingers close about a workpiece.

As heretofore described, the collet mechanism is conventional and the novelty of the present invention resides in the nature of a work stop bar 30 and its cooperation with the other elements. The stop bar 30 is cylindrical in form and has an exterior diameter which allows it to make a loose sliding fit with the interior diameter of the draw bar 24, within which it is disposed. An O-ring 32 fixed to the stop bar 30 aids in retaining the stop bar in central axial alignment within the draw bar 24.

The forward end of the stop bar has a central socket formed therein which is adapted to receive the cylindrical end of one of a plurality of replaceable stops 34 which have appropriate cylindrical end configurations 36 adapted to conform with the rear ends of various workpieces which may be inserted within the collet. A selected replaceable stop 34 is retained within the socket in the stop bar by a set screw 38.

The stop bar 30 has three longitudinally aligned keyways 40 formed along its mid-section at equal circumferentially spaced intervals. The keyways are each adapted to receive a pair of set screws 42 which project from one of three keys 44. Each of the keys 44 is retained in one of three pockets 52 formed at equally spaced circumferential intervals in a circular collar 46. The draw bar 24 and the stop bar 30 pass through the central aperture in the collar 46. The collar is fixed to the spindle 12 by means of screws 48 which pass through a shoulder 50 on the collar. The particular manner of attachment of the collar to the machine is dependent upon the construction of the machine and various forms of mechanical engagement may be provided to accommodate different machines.

The keys 44 project radially inwardly from the pockets 52 and pass through elongated slots 56 formed at spaced intervals through the draw bar 24. This allows the draw bar to move axially so as to engage and disengage the collet from a workpiece without motion of the keys 44.

The inner surfaces of the keys terminate at approximately the inner diameter of the draw bar 24 and the set screws 42 are retained in threaded holes 58 formed radially in the keys 44 and project beyond the holes to engage the bottom surface of the keyways 40 along with the O-ring 32 they retain the stop bar 30 centrally within the draw bar 24.

The slots 56 in the draw bar 24 are sufficiently long to allow the full axial movement of the draw bar required in opening and closing of the collet. The keyways 40 and the set screws 42 allow the position of the stop bar 30 to be adjusted relative to the spindle in order to adjust the position of the end 36 of the stop 34. This is simply done by loosening the set screws 42 and adjusting the position of the stop bar 30 relative to the spindle and then tightening the set screws.

The stop bar is thus fixed for rotation with the spindle so that no abrasion occurs between the stop end 36 and an abutting workpiece end.

When it is desired to use the machine with bar stock which must be fed through the collet, the set screws 42 are retracted until their ends are within the keys 44 and the stop bar 30 is removed. The bar stock is then fed through the collet and the draw bar in the normal manner.

Having thus described my invention, I claim:

1. An adjustable work stop for a machine having a rotary spindle including: a collect rotatably supported within the spindle and slidable with respect to the axis of rotation of the spindle so as to engage and disengage workpieces; an elongated tubular draw bar supported for rotation within said spindle and for slidable motion along the axis of rotation of the spindle, having one end fixed to the collet; means connected to the other end of said draw bar for causing axial movement of the draw bar relative to the spindle; a plurality of axially extending slots formed through the draw bar at circumferentially spacings; a plurality of fastener means fixed with respect to the spindle and projecting radially through said slots in the draw bar; and elongated stop means disposed centrally within said draw bar and retained in an axially adjustable manner by said fastener means.

2. An adjustable work stop of claim 1 wherein the fastener means constitute set screws rotatably supported with respect to the spindle for rotation about axes which are radial to the spindle.

3. The adjustable work stop of claim 1 wherein the stop means is cylindrical and has means formed in one of its ends adapted to retain one of a plurality of stops.

4. The adjustable work stop of claim 1 wherein each of the fastener means is retained in one of a plurality of fastener means retained in one of a plurality of keys which are supported in a fixed manner relative to said collet and are adapted to project radially relative to the collet through said slots in the draw bar.

5. An attachment for a machine having a rotary spindle, collect supported for rotation with the spindle, and a draw bar supported for rotation with said spindle and for axial movement relative to said spindle so as to open and close said collet; comprising, a collar fixed to the spindle and surrounding a portion of said draw bar; a plurality of longitudinally aligned slots formed in the draw bar in the area surrounded by said collar; a plurality of keys supported in said collar and projecting through said slots in the draw bar; fastener means carried by each of said keys and adapted to be adjusted radially relative to the axis of the spindles; and an elongated stop means disposed centrally within said draw bar and adapted to be removably retained in an axially adjustable manner by said fastener means.

6. The attachment of claim 5 wherein said fastener means comprises set screws rotatably supported in radially aligned threaded apertures formed in each of said keys.

References Cited

UNITED STATES PATENTS 2,201,287   5/1940   Cox _____ 279—15

FRANCIS S. HUSAR, Primary Examiner

U.S. Cl. X.R.

82—34 C